United States Patent [19]

Kawasaki

[11] 4,114,176
[45] Sep. 12, 1978

[54] WEAK CAMERA BATTERY WARNING CIRCUIT

[75] Inventor: Masahiro Kawasaki, Tokyo, Japan

[73] Assignee: Asahi Kogaku Kogyo Kabushiki Kaisha, Tokyo, Japan

[21] Appl. No.: 828,689

[22] Filed: Aug. 29, 1977

[30] Foreign Application Priority Data

Aug. 31, 1976 [JP] Japan .................... 51-116553[U]

[51] Int. Cl.² .................. G03B 7/00; G03B 17/00
[52] U.S. Cl. ......................... 354/289; 354/60 R
[58] Field of Search ........... 354/53, 60 R, 60 E, 354/60 L, 289, 50

[56] References Cited

U.S. PATENT DOCUMENTS

| | | | |
|---|---|---|---|
| 3,804,520 | 4/1974 | Moda et al. | 354/60 E X |
| 3,925,771 | 12/1975 | Satake | 354/60 L X |
| 3,947,855 | 3/1976 | Inoue et al. | 354/60 R X |

Primary Examiner—Michael L. Gellner
Attorney, Agent, or Firm—Sughrue, Rothwell, Mion, Zinn and Macpeak

[57] ABSTRACT

A weak camera battery condition is sensed by a transistor 19 whose conduction is controlled by a voltage divider 20, 21 connected across the battery 22, and in response thereto:

(a) a transistor 4 is rendered conductive to continuously energize the shutter control magnet 3 which holds the shutter open, once released, and prevents any further film advance, (b) a transistor 9 is rendered conductive whereby the shutter speed display meter 8 indicates an extreme or abnormal value, and (c) a transistor 14 is rendered non-conductive whereby an LED 12 is not illuminated when a battery test switch 11 is closed.

5 Claims, 2 Drawing Figures

WEAK CAMERA BATTERY WARNING CIRCUIT

BACKGROUND OF THE INVENTION

This invention relates to a security warning circuit for a camera operable in response to the drop of the supply voltage (battery weakness) below a predetermined threshold.

A number of electronic cameras with automatic shutter control and shutter speed display circuits have recently been developed. In such cameras it is essential to know whether the battery supply voltage is suitable or not, since pictures can only be properly taken when the supply voltage lies within a specified range. A common method of making such a determination involves a display element, such as a light emitting diode, which glows steadily with suitably charged batteries when a test button is depressed, but which flickers when the batteries are low. This method is disadvantageous, however, in that no warning is given unless the battery test button or switch is closed, and the photographer may thus use the camera and take unsatisfactory pictures without realizing that the batteries are too weak.

SUMMARY OF THE INVENTION

According to the present invention a display element, such as an LED, indicates whether or not the supply voltage is suitable when a battery test switch is closed, as in the prior art, but in addition, the shutter control magnet is continuously energized to hold the shutter open, once released, and prevent any film advance, and the shutter speed display element or meter is made to indicate an abnormal value or condition, both in response to a low supply voltage, whereby the photographer is automatically alerted to and warned of the weak batteries whenever the camera is operated.

DETAILED DESCRIPTION OF THE PREFERRED EMBODIMENT

Figure 1:
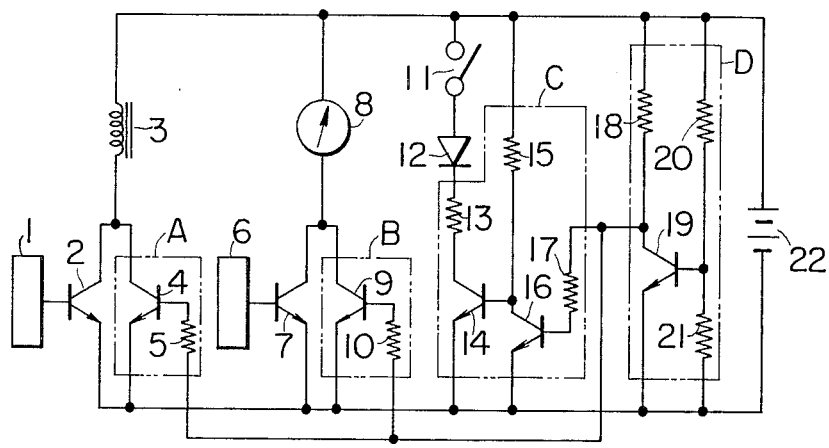
FIG. 1 shows a shematic circuit diagram of one embodiment of this invention.

Referring to FIG. 1, reference numeral 1 designates a time constant circuit whose output is connected to a transistor 2 which drives a shutter control magnet 3, and reference numeral 6 designates a shutter speed circuit whose output is connected to a transistor 7 which drives a shutter speed display meter 8. A circuit D for detecting the voltage of a power supply 22 comprises voltage dividing resistors 20 and 21 and a transistor 19 whose base is connected to the junction of the resistors 20 and 21 and whose collector is coupled to a resistor 18.

A circuit C drives an LED 12 to indicate whether or not the charge level of the supply voltage is suitable upon the closing of a push switch 11. The drive circuit C is responsive to the output of the detecting circuit D, and comprises a transistor 16 whose base and collector are respectively connected to resistors 17 and 15, and a transistor 14 whose base is connected to the collector of transistor 16. The collector of the transistor 14 is connected to a current limiting resistor 13 in series with the LED 12.

When the supply voltage drops below a predetermined threshold, a drive circuit A renders the shutter control magnet 3 continuously energized. This drive circuit A comprises a transistor 4 connected in parallel with transistor 2, and a base resistor 5.

When the supply voltage drops a further drive circuit B causes the meter 8 to display an excessive or abnormal value. Drive circuit B comprises a transistor 9 connected in parallel with transistor 7, and a base resistor 10. The output of the supply voltage detecting circuit D is connected to the inputs of the drive circuits A, B and C.

The operation of the circuit will now be described.

In the detecting circuit D the voltage of the power supply 22 is divided by resistors 20 and 21, and the voltage at their junction is applied to the base of transistor 19. When this voltage is higher than the threshold voltage (approximately 0.6V) of the transistor it is rendered conductive (ON). In contrast, when the junction voltage falls below the threshold level transistor 19 is rendered non-conductive (OFF). Accordingly, if the ohmic ratio of resistors 20 and 21 is selected such that when the supply voltage becomes too low for proper camera operation, the voltage at the junction of the resistors is equal to the threshold voltage of transistor 19, then the latter is conductive when the supply voltage is suitable and non-conductive when it is insufficient.

When the supply voltage is suitable and transistor 19 is conductive, transistors 4 and 9 are both held non-conductive by reason of their low base potentials. Accordingly, the shutter operation is controlled by the timing circuit 1, and the shutter speed is accurately displayed by the meter 8. At the same time, transistor 16 is non-conductive and transistor 14 is conductive or enabled. Therefore, the LED 12 is energized and emits light whenever the switch 11 is closed, thereby indicating that the supply voltage level is suitable.

When the supply voltage becomes too low transistor 19 is rendered non-conductive, which in turn renders transistor 4 conductive. As a result, the shutter control magnet 3 is held continuously energized. This holds the shutter open, once the front curtain is released by depressing the shutter release or picture button, which of course overexposes the picture being taken. At the same time, however, the photographer is audibly alerted to the low battery condition, and the film cannot be advanced with the shutter held open whereby no further bad exposures can be made. At the same time, transistor 9 is rendered conductive which causes a large current to flow through the meter 8. This results in a maximum deflection of the meter pointer, thereby indicating the insufficient supply voltage condition. In addition, transistor 16 is rendered conductive which cuts off transistor 14, and thus the LED 12 is not energized when switch 11 is closed to thereby indicate that the supply voltage is insufficient.

Figure 2:
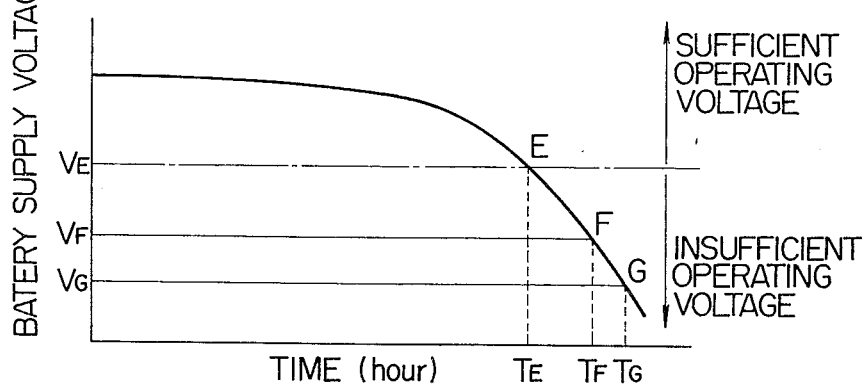
FIG. 2 shows a supply voltage versus time plot with various voltage threshold levels.

FIG. 2 is a graphical representation showing the relationships between time and the supply voltage level. When the supply voltage is higher than $V_E$ normal shutter control and shutter speed display is implemented, and the LED 12 is energized when the switch 11 is closed. When the supply voltage is within the range of $V_E$ to $V_F$, the shutter control magnet is continuously energized to hold the shutter open, once released, and prevent further camera usage. When the supply voltage is within the range of $V_E$ to $V_G$, the meter 8 indicates an abnormal condition. When the voltage falls below $V_F$ the attractive force of the magnet 3 becomes insufficient to hold the rear shutter curtain, and when it falls below $V_G$ the meter pointer cannot move. Furthermore, any time the supply voltage is less than $V_E$ the LED 12 is not energized the battery test switch 11 is depressed, thereby indicating the weak battery condition.

What is claimed is:

1. A circuit arrangement for warning when a camera battery supply voltage falls below a predetermined threshold level, comprising:
   (a) circuit means for detecting when the battery voltage falls below the predetermined threshold level and for producing an output signal in response thereto,
   (b) a first drive circuit for rendering a shutter control magnet continuously energized in response to said output signal,
   (c) a second drive circuit for causing a shutter speed display element to indicate an extreme value in response to said output signal, and
   (d) a third drive circuit for disabling a battery test indicator in response to said output signal.

2. A circuit arrangement as defined in claim 1, wherein the detecting circuit means comprises a voltage divider connected across the battery, and a transistor whose base terminal is connected to the voltage divider junction.

3. A circuit arrangement as defined in claim 1, wherein the first drive circuit comprises a transistor whose collector-emitter path is connected in series with the shutter control magnet and whose base terminal is connected to the detecting circuit means.

4. A circuit arrangement as defined in claim 1, wherein the second drive circuit comprises a transistor whose collector-emitter path is connected in series with the shutter speed display element and whose base terminal is connected to the detecting circuit means.

5. A circuit arrangement as defined in claim 1, wherein the third drive circuit comprises a transistor whose collector-emitter path is connected in series with the battery test indicator, and active circuit means connected between the base terminal of said transistor and the detecting circuit means for rendering said transistor non-conductive in response to said output signal.

* * * * *